United States Patent [19]

Rawlings et al.

[11] 4,217,370
[45] Aug. 12, 1980

[54] LIPID-CONTAINING FEED SUPPLEMENTS AND FOODSTUFFS

[75] Inventors: Robert M. Rawlings; Donald Procter, both of Boise, Id.

[73] Assignee: Blue Wing Corporation, Boise, Id.

[21] Appl. No.: 947,194

[22] Filed: Sep. 29, 1978

Related U.S. Application Data

[63] Continuation of Ser. No. 827,572, Aug. 25, 1977, abandoned, which is a continuation-in-part of Ser. No. 665,005, Mar. 8, 1976, abandoned.

[51] Int. Cl.² .............................................. A23K 1/18
[52] U.S. Cl. ...................................... 426/98; 426/573; 426/601; 426/641; 426/807
[58] Field of Search ..................... 426/2, 98, 104, 601, 426/641, 646, 802, 807

[56] References Cited

U.S. PATENT DOCUMENTS

| 155,517 | 9/1874 | Huch . | |
|---|---|---|---|
| 653,956 | 7/1900 | Hamilton . | |
| 688,604 | 12/1901 | Dietrich et al. . | |
| 3,116,206 | 12/1963 | Brynko et al. ................... | 252/316 X |
| 3,137,631 | 6/1964 | Soloway ................................ | 163/83 |
| 3,821,453 | 6/1974 | Hoer ..................................... | 426/506 |
| 3,925,560 | 12/1975 | Scott et al. ......................... | 426/98 X |
| 3,929,890 | 12/1975 | Pfister ................................. | 426/580 |
| 4,007,284 | 2/1977 | Goryaev et al. ...................... | 426/98 |

FOREIGN PATENT DOCUMENTS 2322462 5/1973 Fed. Rep. of Germany .
1349404 4/1974 United Kingdom .

OTHER PUBLICATIONS

"Proteins in Human Nutrition", Porter et al., pp. 407–411, Academic Press, London & New York, N.Y. 1973.

Primary Examiner—Robert L. Lindsay, Jr.
Attorney, Agent, or Firm—Richards, Harris & Medlock

[57] ABSTRACT

A process for making lipid-containing foodstuffs comprising solubilizing particulate proteinaceous matter, admixing a lipid material so as to form an emulsion, and contacting the emulsion with an effective amount of a pH adjusting agent to lower the pH to its isoelectric point, thereby aggregating the protein and simultaneously microencapsulating the lipid.

97 Claims, No Drawings

LIPID-CONTAINING FEED SUPPLEMENTS AND FOODSTUFFS

This is a continuation of copending application Ser. No. 827,572, filed Aug. 25, 1977 which is a continuation-in-part of application Ser. No. 665,005 filed Mar. 8, 1976, both now abandoned.

BACKGROUND OF THE INVENTION

This invention relates to lipid-containing foodstuffs and feed supplements. One aspect of this invention relates to a process for making processed meat products such as sausage and bologna that contain microencapsulated fat. Another aspect of the invention relates to a process for microencapsulating lipids in either animal or vegetable protein. A further aspect of the invention relates to animal foodstuffs produced by treating animal processing wastes from meat packing plants. In still another aspect, this invention relates to ruminant feed supplements characterized by their high lipid content and their ability to pass through the rumen substantially unchanged for subsequent digestion in the abomasum and lower gut of the ruminant animal.

Many processes for treating proteinaceous materials are disclosed by earlier references such as U.S. Pat. Nos. 3,137,631; 3,821,453 and 3,925,560. While these earlier teachings disclose processes for denaturing proteins by treating them with acid, alkali and aldehydes, or by subjecting them to high temperatures and pressures, a need still exists for an effective process to microencapsulate lipids within dietary proteins in the production of foodstuffs for humans and other animals.

The meat processing industry has long sought methods for incorporating fat and water within meat products such as sausage and bologna. Two problems are commonly associated with the manufacture of such products. One problem relates to frictional heating that occurs during mixing of emulsion type processed meat. Unless ice is added during emulsification, the fat dispersed throughout the meat will melt and separate therefrom. The other problems relates to the separation of fat and water from such products during cooking. This separation not only results in product shrinkage, but also reduces the desirable juiciness that is ordinarily attributable to higher fat and moisture content within the cooked product.

Other problems faced by the meat processing industry relate to the production of canned meats intended for consumption by either humans or domestic pets. The high energy value associated with fats makes their incorporation in such canned meat products highly desirable. However, when processed according to methods previously known, fats have demonstrated a tendency to migrate out of the product and collect at the container wall or float to the top of the can, spoiling the comestic appearance of the product.

Another problem relates to the manufacture of canned soups. Fat contained in soups manufactured according to presently known processes tends to separate and float on the surface during cooking.

Because of the increasing concern about heart disease associated with high saturated fat diets, there is also a need for food products having a low saturated fat content. A problem has previously existed in producing such products in a form that is palatable, yet adequate for the dietary needs of people concerned about heart disease. This invention will permit the inclusion of polyunsaturated vegetable oils into meat protein in a stable form that will not separate out during cooking. This process will greatly enhance the flavor and palatability of such dietary products.

Additionally, the meat processing industry has long sought better methods of utilizing animal bones and other nutritive waste materials. The present invention provides an efficient way of utilizing such materials to form nutritious animal feed supplements without the disadvantages associated with heat rendering and extraction processes formerly used.

Because meat, meat by-products and milk all contain large amounts of fat, an aim of modern livestock feeding techniques is to increase the amount of lipids ingested by the animals. Currently, most of the lipid materials used to supplement stock feeds are incorporated in a liquid form. Hot liquid lipids are sprayed onto the other nutritional ingredients and allowed to coalesce before feeding. One disadvantage of this method is that such feeds cannot be stored for any appreciable amount of time because of their tendency to turn rancid, to become contaminated, and to attract insects. Furthermore, ruminant animals present a special problem with regard to lipid supplemented feeds. High fat diets fed to ruminants in a free fat form have been found to cause severe gastric upset, resulting in loss of appetite and decreased weight gain. The protein-encapsulated lipids of the present invention will effectively resist diegestion in the rumen, and thereby avoid associated gastric upset.

SUMMARY OF THE INVENTION

According to the present invention, a novel process is provided for manufacturing foodstuffs and feed supplements containing microencapsulated lipids by solubilizing protein in the presence of an aqueous medium, admixing a lipid material so as to form an emulsion, and then lowering the pH of the emulsion to its isoelectric point so as to aggregate the protein and simultaneously microencapsulate the lipid.

Meat products manufactured by the disclosed process are characterized by increased juiciness and reduced shrinkage due to the presence of microencapsulated lipids. The novel process disclosed herein also permits the manufacture of low saturated fat, low cholesterol foodstuffs more palatable than those previously known. This invention also provides for better utilization of waste materials from animal packing plants by a process more environmentally acceptable than the heat rendering techniques presently used. In another aspect, improved lipid-containing feed supplements suitable for domestic pets and ruminant animals are also provided.

DETAILED DESCRIPTION OF THE INVENTION

Lipids are microencapsulated in protein by solubilizing particulate proteinaceous matter in an aqueous medium with an effective amount of a solubilization agent, admixing a lipid material with the solubilized protein so as to form an emulsion, and contacting the emulsion with an effective amount of a pH adjusting agent to lower the pH of the emulsion to its isoelectric point. Proteinaceous materials suitable for use in the present invention can be derived from either animal or vegetable sources. Examples of suitable proteinaceous materials include beef, pork, poultry, fish, milk whey, cheese, soybeans, and the like.

Proteinaceous materials suitable for use with the present invention will generally contain at least 5 weight percent protein. Where the amount of protein in the resulting emulsion is less than about 5% by weight the microencapsulation remains stable in a wet system, but may release fat on drying.

Solubilization of the proteinaceous matter will generally require the presence of an aqueous medium comprising from about 50% to about 70% of the resulting solution. The aqueous medium can include water contained within meat, blood, or other proteinaceous matter, as well as water contained within the solubilization agent or added by itself.

The solubilization agent is mixed with the proteinaceous matter in a sufficient quantity to solubilize the protein. Solubilization agents suitable for use with the present invention include the nontoxic alkali and alkaline earth metal hydroxides. Sodium hydroxide is a preferred protein solubilization agent where the process of the invention is used for making foodstuffs intended for human consumption. In general, the pH should be raised to a level in the range of from about 9 to about 13, depending upon the particular protein being utilized.

When the protein has been solubilized, the resulting solution is admixed with a lipid material so as to form an emulsion. Lipids suitable for use in the present invention include both animal fats and vegetable oils. According to one embodiment of the invention, the lipid material is combined with the proteinaceous matter prior to the addition of the solubilization agent. To facilitate dispersion it is desirable that lipids existing in the solid state at ambient temperatures be elevated to their melting points before or during the emulsification process. Hydrogenated lipids suitable for use in accordance with the present invention should melt at temperatures ranging from about 40 degrees C to about 55 degrees C, or in some cases, up to about 60 degrees C. Overheating should be avoided since it may render the protein insoluble in the aqueous medium. The mixing means utilized to emulsify the lipid material within the proteinaceous solution should be capable of reducing the size of the lipid globules to a range of from about ½ to about 50 microns, and preferably from about ½ to about 10 microns. After emulsification, the lipid globules should be homogeneously dispersed throughout the continuous phase of solubilized proteinaceous matter.

The emulsion is then contacted with an effective amount of a pH adjusting agent to lower the pH of the emulsion to its isoelectric point. The isoelectric point is generally defined as the pH at which the net charge on a molecule in solution is zero. The isoelectric points of the proteinaceous materials suitable for use in the present invention range from a pH of about 3 to about 8.5, depending upon the particular protein utilized. It may be desirable to adjust the pH of the emulsion below the isoelectric point when mixtures of proteins are used, or when the intended product is a dry particulate. In the latter case, the lower pH induces syneresis, causing water to be exuded from the emulsion. The pH adjusting agents suitable for use with the present invention include phosphoric acid, hydrochloric acid, lactic acid, acetic acid, sulfuric acid, and salts of polyvalent metals. Some additional mixing may be required after the addition of the pH adjusting agent to ensure that the emulsion is uniformly contacted.

According to a preferred embodiment of the invention, animal fat is microencapsulated within the proteinaceous material contained in processed meat products such as sausages, bologna, meat patties and the like. The improved foodstuffs of this invention are prepared by first blending together the desired ingredients of the particular meat product to be made. Desired ingredients can include both animal and vegetable proteinaceous materials, animal fat, vegetable oils, spices, flavorings, preservatives, and the like. These components are preferably ground to a particle dimension of less than about ⅛ inch to prepare them for solubilization and emulsification.

A protein solubilization agent is then blended with the ground ingredients in the presence of an aqueous medium. A preferred solubilization agent for use in the embodiment is an aqueous solution of sodium hydroxide. Enough solubilization agent should be added to the mixture to raise the pH thereof to a level ranging from about 9 to about 13, and preferably from about 10 to about 12.

After the protein has been solubilized, the ingredients are emulsified by any suitable mixing means including commercially available blenders, mixers, and high speed homogenizers. During emulsification the frictional heat created by the mixing means should be allowed to rise above the melting point of the lipids contained within the mixture. A temperature of from about 40 degrees C. to about 60 degrees C. is usually adequate for this purpose. The lipid material within the emulsion should be dispersed into discrete globules in the range of from about ½ to about 50 microns in size, and preferably in the range of from about ½ to about 10 microns. The emulsion should contain from about 50% to about 60% water, although it is possible to effect the process with lesser amounts. The product can also be extended by adding more water to the point of forming a liquid dispersion.

The emulsion is next treated with a pH adjusting agent to lower its pH to the isoelectric point. At the isoelectric point the proteinaceous material in the emulsion will aggregate, thereby encapsulating the lipid. A preferred pH adjusting agent for use with this embodiment is hydrochloric acid, which, when reacted with the sodium hydroxide contained in the emulsion, will form salt (sodium chloride). The isoelectric point at which the emulsion will aggregate is normally at a pH ranging from about 6.5 to about 8.5. While the ratio of protein to fat is almost a matter of choice since the process will operate over a wide range of mixtures, a minimum ratio of 5% protein to fat is generally required to microencapsulate all of the lipid.

According to another embodiment of the invention, a process is provided for producing animal meal from waste materials of meat packing, poultry and fish processing plants. Such animal waste can include meat scraps, fat, bones, blood, entrails, and the like. The improved animal meal of this invention is suitable for feeding animals such as ruminants in a commercial feeding operation, as well as domestic pets such as dogs and cats. The improved animal meal can be utilized in aggregate form, or dried to a granular to powder-like particulate solid. Fat microencapsulated within the meal will not tend to separate out as with other commercially available products.

According to this embodiment, the animal processing waste is first ground to a slurry. Other proteinaceous material such as vegetable protein can be added to supplement the animal waste. While any combined ratio of animal fat to protein can be utilized, at least 5 weight percent of the blended slurry should be protein to ensure microencapsulation of all of the fat.

When proteinaceous material intended for use in the present invention contains animal bones, the bones must be mechanically reduced so as not to adversely affect the animal by whom the product is ultimately consumed. Preferably, the bone should be reduced to a dimension no greater than about 1½" across and the crushed bone should not contain sharp splinters which, when consumed by an animal, could penetrate some part of the gastrointestinal tract, resulting in peritonitis.

A typical process of handling animal bones to achieve the desired result includes passing the bones, together with the associated protein and fat which result from deboning operations in packing plants, through a hog breaker that reduces the bones to a broken particulate form with particle dimensions of about 1½" in length. The crushed bone is then passed, sometimes with the addition of water to assist mobility and reduce frictional heat buildup, through a standard type grinding/cutting machine fitted with an orifice cutter plate, which further reduces the bones to a size having a particle dimension not more than ½" in length. The size of the cutter blade is preferably within the range of from about ½" to about ¾" at this stage. A suitable machine for this purpose is a Wyler grinder, a machine common to the meat processing industry that consists of a feed screw powered by an electric motor which forces a particulate material through an orifice cutter plate. The crushed material may then be treated with additional cold water to again increase mobility and reduce frictional heat. The material is next passed to a disintegrator where it is homogenized, thus forming an emulsion of the meat protein and fat while reducing the bone particles down to a particle dimension of less than about ⅛".

Prior to, during, or after the animal waste is ground, an effective amount of a protein solubilization agent is added to the slurry to elevate its pH to a level ranging from about 9.5 to about 13. Sufficient solubilization agent should be added to solubilize all of the protein contained in the slurry. The preferred solubilization agent for this embodiment is sodium hydroxide, but other alkali or alkaline earth metal hydroxides can be used. Solubilization should take place in an aqueous medium, and the moisture content of the resulting emulsion should preferably range from about 50% to about 60%. If the solubilization agent is added to the ground animal waste prior to or during the grinding step, it will be sufficiently admixed by the grinder. However, if added after the grinding step, additional mixing is required to effectively disperse the solubilization agent throughout the slurry. After the solubilization agent is added, the slurry should be maintained for an effective period to solubilize the protein contained therein. When working with fresh packing plant animal wastes, a period of about 1 to about 3 minutes is required to effect the solubilization. However, if biodegradation of the animal waste occurs prior to processing, larger amounts of the solubilization agent and a longer maintenance period may be required. The solubilized slurry is then ready for emulsification.

Production of a satisfactory emulsion depends upon the degree of mechanical agitation applied to the slurry, the temperature of the slurry, and the extent to which the protein has been solubilized. In the preferred embodiment, the temperature of the slurry containing the protein and fat should be adjusted to at least that of the melting point of the fat in order to assist dispersion within the emulsion. A temperature range of from about 45 degrees C. to about 60 degrees C. is suitable for most animal fats. These temperatures can be achieved by frictional heating induced during mechanical agitation, or by external heat sources. The dimension of the discrete lipid globules formed during emulsification will range from about ½ to about 50 microns, and preferably from about ½ to about 10 microns.

After emulsifying the slurry containing the solubilized protein and fat, the emulsion is contacted with a pH adjusting agent to lower the pH to at least its isoelectric point. At the isoelectric point, the proteinaceous material contained within the emulsion will aggregate and simultaneously microencapsulate the lipid. The amount of pH adjusting agent necessary to effect aggregation will vary according to the quality of the animal waste. The isoelectric points for emulsions of the type herein described range from about 3 to about 8.5. However, if the animal waste has biodegraded, and depending upon the degree of degradation, the isoelectric point may fall outside of that range.

While it is believed that any acidic material could be used as a pH adjusting agent, there are some acids such as nitric acid that should not be used in the preparation of animal meals. Acceptable acids for use in the present embodiment include phosphoric acid, hydrochloric acid, sulfuric acid, and acetic acid. In the above embodiment, the pH adjusting agent is a 75% to 85% concentrated phosphoric acid.

Upon aggregation of the proteinaceous material in the emulsion, the fat globules contained therein are substantially encapsulated by the proteinaceous material. The resulting product can be utilized in the wet aggregate form or dried to a granular to powder-like free flowing particulate material. In order to prepare a dried particulate product, water should be exuded from the aggregate. This can be accomplished by lowering the pH level to below about 6.5 through the addition of more pH adjusting agent, thereby inducing syneresis. During syneresis a substantial portion of the water will separate from the aggregate. The aggregate can then be pressed or centrifuged to remove the free water. The dry product should not contain more than about 14 weight percent water, and preferably from about 10 to about 12 weight percent water. Where the dry product contains greater than about 15 weight percent water, there is a tendency for the product to mold during storage.

A drying means suitable for use with the present embodiment is a commercially available agricultural dehydrator.

After drying, the desired particle size can be achieved through use of a hammer mill or similar particulate reduction equipment.

According to another embodiment of the invention, improved lipid-containing feed supplements suitable for domestic pets and ruminant animals are similarly prepared. The lipid-containing proteinaceous emulsions of this embodiment should comprise from about 5 to about 40 weight percent protein, from about 50 to about 70 weight percent water, and from about 6 to about 25 weight percent lipid.

The proteinaceous solution can be prepared in a stainless steel vertical tank fitted with a heavy-duty stirrer. Water is deposited in the tank and a proteinaceous material is admixed therewith until thoroughly wetted. Proteinaceous materials suitable for use in this embodiment include blood, casein, oilseed protein, soybeans, soymeal, and other animal or vegetable proteinaceous material. One preferable proteinaceous mixture for use in this embodiment consists of 100 parts soymeal to 35 parts sunflower meal.

Once the proteinaceous material is thoroughly wetted, an amount of solubilization agent sufficient to ensure complete solution of the protein is added to the mixing tank. While suitable solubilization agents include the nontoxic alkali and alkaline earth metal hydroxides, sodium hydroxide is the preferred agent for use in this embodiment.

After solubilization, a lipid material is added to the proteinaceous solution and thoroughly stirred. The lipid material should comprise from about 6% to about 25% by weight of the emulsion, and can include vegetable oils, fish oils and animal fats. If hydrogenated animal fat is used, it is melted by heating to a temperature in the range of from about 40 degrees C. to about 60 degrees C. prior to mixing. The mixture of proteinaceous solution and lipids should be stirred until an oil-in-water emulsion is formed. The globules of lipid materials should be dispersed throughout the proteinaceous continuous phase and sizes ranging from about ½ to about 50 microns, and preferably from about ½ to about 10 microns.

After the emulsion is formed, a gel is produced by lowering the pH of the emulsion to 6.0 or below. The degree of gelatinization which occurs can be controlled by varying the pH level to which the emulsion is lowered. If the pH is greater than 6, a slack gel that cannot be effectively dried by conventional agricultural drying means may result, especially if a relatively large portion of the protein is a vegetable protein. Where the pH of the emulsion is lowered to a value from about 3.5 to about 5.0, however, a firm gel suitable for use with conventional drying equipment is produced.

Examples of some acceptable pH adjusting agents include phosphoric acid, hydrochloric acid, sulfuric acid, and acetic acid. The preferred pH adjusting agent for use with this embodiment is a 75% to 85% solution of phosphoric acid. The amount of pH adjusting agent necessary to form the desired gel will vary according to the type of lipid material used. Generally, the higher the free fatty acid content of the lipid employed, the more pH adjusting agent must be used to obtain the desired pH value.

Prior to drying, the removal of free water by centrifuging, pressing and the like is desirable. Conventional types of agricultural dryers include rotary drum dryers, turn dryers, and flash or fluid bed dryers. The above-described gel can be dried using any of these drying techniques. The moisture content of the gel is reduced by drying to not more than about 14%, and preferably from about 10% to about 12%, by weight of the gel. Particle size of the feed supplement will be related to the amount of agitation that occurs during drying.

The powdered feed supplement will generally contain from about 20% to about 60% lipids by weight. Absorbent materials such as silicate, bentonite, alfalfa meal, oats, bran, and bagasse can be added if desired. When such absorbents are present, the protein content of the feed supplement should range from about 5% to about 35% by weight thereof. In addition, various medicaments such as common types of antibiotics and lipid soluble vitamins can be added to the lipid before the emulsion is formed.

The high lipid feed supplement formed by the above-described process can be used for various types of animals including dogs, cats, or even fish food. The fat content of conventional dry food for dogs and cats has previously been limited by the processing capabilities of commercially available extruders. Because of the high energy content of fats and oils, it is often desirable to include within such animal foods more lipids than can be processed through an extruder. Spraying melted lipids over the kibble has also proved ineffective since the lipids migrate to the container walls and become rancid when exposed to oxygen. The microencapsulated fats and oils of the subject invention incorporate fats and oils into the kibble in higher proportions than were formerly achievable.

Another significant application of the disclosed process relates to ruminant feed supplements. Normally, ruminants cannot be fed a diet containing more than about 2% to about 6% fat. Feeds containing more fat apparently inhibit rumen function and seriously impair the complex ruminant digestive system. The novel feed supplement of the present invention has been used to increase the fat content of ruminant feedstuffs up to about 12% without any deleterious effects that previously accompanied such a high fat diet. It is believed that the surprising results are obtained because the lipid content of the feed supplement is entrapped or encapsulated within the proteinaceous material, and therefore does not inhibit the functioning of microflora contained in the rumen. Instead, the majority of the lipid in the feed supplement is released after passing through the rumen into the abomasum or lower gut. This invention provides a high lipid feed supplement with improved handling characteristics and having the unexpected capability of allowing the fat content of a ruminant animal's diet to be increased to about 15%, depending upon the balance of the ruminants ration.

The invention can be more readily understood by reference to the following examples that more fully describe the embodiments discussed herein.

EXAMPLE 1

1,000 g of a mixture of lean meat and trim fat comprising about 20% protein was ground through a ⅛" orifice plate, then contacted with 215 g of a 7% solution of sodium hydroxide. That mixture was heated to a temperature of 41 degrees C in a water jacketed pan with stirring. The heated mixture was then homogenized in a Waring blender for about 30 seconds to form an emulsion. The emulsion thus formed has a pH of 11.8. 25 g of an 85% solution of phosphoric acid was then mixed into the emulsion. A firm granular textured gel resulted which had a pH of 6.5. An aliquot of the gelled material was boiled in water for 2 minutes. No signs of free fat were observed, indicating that the fat was effectively encapsulated and remained stable in a wet heat environment.

EXAMPLE 2

1,000 g of trim fat having a fat content of 55.5% as determined by Hobart analysis was contacted with 310 g of a 3.2% solution of sodium hydroxide. The mixture was heated to 54 degrees C in a water jacketed pan, then mixed in a Waring blender to form an emulsion having a pH of 10.9. The emulsion thus formed was contacted with 12 g of an 85% solution of phosphoric acid. The resulting firm textured gel had a pH of 7.5. The gel was ground through a ⅛" orifice plate to form a granular texture suitable for blending into meat patties and sausages.

EXAMPLE 3

A sample of the microencapsulated fat prepared as described in Example 2 was subjected to a fat analysis by the same Hobart fat determination equipment and gave a reading of 15.5% fat. The sample was calculated to have a fat content of about 42%, demonstrating that some 63% of the fat remained encapsulated when subjected to the dry heat rendering effect of the Hobart equipment.

EXAMPLE 4

Microencapsulated fat prepared as described in Example 2 was formed into meat patties having a precooked fat content of about 30%. Those patties were compared with meat patties prepared without microencapsulated fat and also having a pre-cooked fat content of 30%.

Recipes:

|  | Recipe Quantity | Contributing Fat |
|---|---|---|
| (a) Microencapsulated Fat 25% Inclusion: | | |
| Microencapsulated fat | 25.0% | 10.50% |
| 50% lean/50% fat | 38.5% | 19.25% |
| 100% lean | 36.5% | .25% |
|  | 100.0% | 30.00% |
| (b) Control | | |
| 50% lean/50% fat | 60.00% | 30.00% |
| 100% lean | 40.00% | 0 |
|  | 100.00% | 30.00% |

Three 100 g meat patties were prepared from the recipes (a) and (b). These were cooked simultaneously on a broiler for 15 minutes (7½ minutes on each side). The patties were then reweighed after cooking. The patties made in accordance with recipe (a) weighed an average of 69.8 g. Those made in accordance with recipe (b) weighed an average of 65.0 g. The percent of shrinkage was therefore 30.2% for recipe (a) and 35% for recipe (b). This represents a 4.8% decrease in shrinkage through the use of microencapsulated fat within the meat patties.

EXAMPLE 5

1,000 g of fat containing about 5% collagen was ground through a ¼" orifice plate, then contacted with 512 g of a 2.3% solution of sodium hydroxide. The resulting mixture, having a pH of about 11.7, was heated to approximately 60 degrees C in a water jacketed pan. The heated mixture was then transferred to a Waring blender and mixed for 1 minute to form an emulsion. The emulsion was allowed to stand for ½ minute, then contacted with 20 g of an 85% solution of phosphoric acid. The pH of the resulting emulsion was about 7.5. A good gel resulted when the phosphoric acid solution was mixed into the emulsion. In this case the fat was microencapsulated within the collagen proteins associated with the fat.

EXAMPLE 6

A meat patty was prepared containing 50% encapsulated fat as described in Example 5, 25% lean meat, and 25% fat. These were mixed together and formed into a patty weighing 100 g. The patty was cooked for 15 minutes in a broiler (7½ minutes on each side) and then reweighed. After cooking, the patty weighed 90.2 g. This represented a shrinkage of 9.8%. The fat content of the meat patty before cooking was 51.1% as determined by Hobart analysis.

A 100 g patty was also prepared from standard meat trimming containing approximately 50% lean meat and 50% fat. This was cooked simsultaneously with the patty containing 50% of microencapsulated fat. After cooking, this patty weighed 74.2 g, reflecting a shrinkage of 25.8%. This experiment demonstrates the effectiveness of the microencapsulation process in retaining more of the juices of the meat patty as compared with an untreated product.

EXAMPLE 7

This experiment was conducted in three parts:

I. 48 g of textured vegetable protein ("Supro 50" Ralston Purina) was contacted with 196 g of a 1% sodium hydroxide solution and blended in a food mixer fitted with a whisk attachment until a smooth texture resulted, about 5 minutes mixing time. 160 g of safflower oil was then added and the mixture stirred at high speed until an emulsion had formed. The pH of the emulsion thus formed was 11.7. The emulsion was then contacted with 8 g of an 85% solution of phosphoric acid in order to lower the pH of the emulsion to its isoelectric point, about 7.5. The resulting product was a firm granular gel. A sample of the gel was boiled in water for 5 minutes and showed a negligible amount of free fat.

II. The microencapsulated safflower oil was then mixed together with ground lean beef in the ratio of 600 g beef to 400 g encapsulated oil.

III. Utilizing the mixture of ground beef and encapsulated oil as described in part II, a meatloaf was made according to the following recipe:

| INGREDIENTS | NO. OF GRAMS |
|---|---|
| mixture from part II | 1,000 |
| milk | 120 |
| bread crumbs | 150 |
| eggs | 120 |
| carrot (ground) | 50 |
| tomato sauce | 30 |
| salt | 5 |
| pepper | 3 |

Method:

1. The encapsulated oil and beef mixture, bread crumbs, carrot, tomato sauce, salt and pepper were blended together.
2. The eggs and milk were beaten together and then blended into the mixture of step 1.
3. The blended mixture was placed into a loaf pan and cooked at 325 degrees F for 1½ hours.

The result was a good textured product with no signs of free fat. Palatability was good with no adverse vegetable oil flavor. A laboratory fat analysis indicated 15% fat in the finished meat loaf, 13% calculated as vegetable oil and the balance contributed by other ingredients.

EXAMPLE 8

100 g of ground cheddar cheese was contacted with 50 g of a 4% solution of sodium hydroxide, then mixed in a Waring blender until homogeneous. The pH of the homogeneous mixture was 9.3. The mixture was contacted with 5 g of an 85% solution of phosphoric acid, with a resulting pH of 4.7. The mixture thickened and formed a crumbly gel. The gel was dried in a fluid bed dryer to form a granular to powder particulate having no signs of free fat. A sample of the dried material was oven roasted and resulted in a palatable powder having a toasted cheese flavor.

EXAMPLE 9

Cow trimmings containing about 50% fat and 50% lean meat were treated by the process of Example 2. The material thus formed was then blended with additional cow trimmings in the ratio of 20% treated material to 80% untreated material. The blended material was subjected to a standard bacteriological plate count and compared with a similar sample of 100% untreated cow trimmings. The results were as follows:
Total Plate Count Before Treatment: 12,000 organisms/g
Total Plate Count After Treatment: <10 organisms/g
Total Plate Count of Blended Material: 710 organisms/g
The sterilizing effect of the microencapsulated process is thereby clearly demonstrated.

EXAMPLE 10

200 g of finely ground beef bones containing approximately 55 weight percent water and approximately 23 weight percent protein was heated to a temperature of about 55 degrees C. After transfer of the slurry to a Waring blender, 2 g of sodium hydroxide was added thereto and the slurry was blended for 1 minute. The alkali treated slurry was allowed to stand for 2 more minutes, then blended again for 15 seconds. With the blender still running, 4 g of an 85% solution of phosphoric acid was admixed to form an emulsion. The proteinaceous material in the emulsion aggregated within a few seconds to the point where the agitator was no longer effectively mixing, and the blender was stopped. Blending continued by hand stirring until a uniformly aggregated texture resulted. The pH of the slurry was 12.4 after the addition of sodium hydroxide, and 7.5 after the addition of phosphoric acid.

A sample of the aggregate mixture was placed in a beaker containing cold water and a similar glass beaker was prepared with a sample of untreated ground bone material. After the samples were agitated to disperse the mixtures in the water, both samples were heated simultaneously with occasional stirring until both mixtures boiled. After a few minutes of boiling, both samples were removed from the heat and allowed to stand until cold. After cooling, free fat could be observed on the surface of the water containing the untreated bone mixture, while on the surface of the water containing the treated sample, no fat was observed. This test procedure demonstrated the effectiveness of the microencapsulated fat process.

The aggregate material was then dried in a laboratory fluid bed dryer, resulting in a granular to powder free flowing particulate having a brown color and containing ground bone particles. No signs of free fat were observed.

EXAMPLE 11

A quantity of poultry processing wastes containing the necks and backs obtained as by-products from breaking down operations of poultry packaging plants was ground in a standard meat grinder fitted with a ⅛" cutter. The resulting material was slurry-like with obvious signs of free fat and water. 200 g of this slurry, which had been previously stirred to a uniform mixture, was heated in a water jacketed boiler to a temperature of about 55 degrees C. The heated slurry was then transferred to a Waring blender and 2 g of sodium hydroxide was added to solubilize the proteinaceous material. The slurry as agitated for a minute and allowed to stand for 2 minutes. After standing, the slurry was again agitated for 15 seconds and, while the agitator was still running, 4 g of 85% phosphoric acid was added to the emulsion. After a few seconds the emulsion aggregated to a point where the agitator blade was no longer effectively mixing and the machine was stopped. Blending was continued by hand stirring until the phosphoric acid had been thoroughly blended and a uniform aggregate formed. A sample of the treated aggregate material was placed in a beaker of cold water and a similar sample of untreated material was likewise prepared in a separate beaker. The two samples were stirred to disperse them thoroughly in the cold water, then heated simultaneously until the water of both samples was boiling. Boiling was allowed to continue for a period of from about 2 to about 3 minutes at which time the samples were removed from the heat and allowed to stand until cool. Upon cooling, the untreated sample had obvious signs of free fat on the surface of the water whereas the treated sample gave no apparent signs of free fat, thus demonstrating the effective microencapsulation of the fat.

EXAMPLE 12

200 g of chicken waste prepared as described in Example 11 was heated to a temperature of about 54.5 degrees C. Approximately 0.25 g of papain, a proteolytic enzyme, was added to the heated mixture which was then stirred to disperse the papain. The mixture was transferred to a Waring blender in which the bowl had been previously heated to prevent chilling of the heated chicken waste. Following agitation of the mixture, a rapid change in the viscosity was apparent as the protein was digested. This procedure resulted in a mobile liquid with an appearance of an emulsion. The sample digest was divided into two equal parts, with one part (approximately 100 g of the digest material) being treated with 1 g of sodium hydroxide and agitated in a Waring blender at a temperature of about 52 degrees C. for a period of 30 seconds. The slurry was allowed to stand for 2 minutes and then agitated again for a period of about 15 seconds during which time 2 g of 85% phosphoric acid was added, resulting in a slight thickening of the aggregate thus formed. This sample and the untreated sample were placed in separate beakers with cold water and heated simultaneously until boiling. The samples were then allowed to stand until cool, after which signs of free fat were apparent on the surface of the untreated sample. The treated sample had no visible signs of free fat, demonstrating that the fat contained therein had been effectively microencapsulated.

EXAMPLE 13

200 g of chicken waste prepared as discussed in Example 11 was heated to about 60 degrees C. 2 g of sodium hydroxide was added and stirred into the chicken slurry and then transferred to a Waring blender where the slurry was mixed for about 1 minute and then allowed to stand for about 2 minutes. The slurry was again agitated for 15 seconds and, with the blender still running, 4 g of 85% phosphoric acid was added thereto. The slurry quickly thickened and effective stirring of the agitator ceased. The machine was stopped and a uniform aggregate formed by hand stirring. The pH of the slurry was 12.1 after addition of the sodium hydroxide and 7.3 after the addition of the phosphoric acid.

The resulting aggregate was transferred to a previously warmed beaker and stirred by hand for a few seconds to distribute the heat, whereupon 0.5 g of papain, a proteolytic enzyme, was blended in with continued hand stirring. After about 30 seconds, the aggregate began to liquify and after 2½ minutes, a liquid solution resulted. The liquid solution was then heated until boiling and after boiling some 2 or 3 minutes, the solution was allowed to cool. No signs of free fat were apparent on the surface of the liquified solution, demonstrating that the fat contained therein was effectively microencapsulated.

EXAMPLE 14

A high lipid content feed supplement was produced in the following manner. A 200 gallon stainless steel vertical tank fitted with a heavy-duty stirrer having a shaft speed of approximately 34 rpm was filled with 450 lbs. of water at approximately 65 degrees C. With the heavy-duty stirrer activated, 100 lbs. of soymeal and 35 lbs. of sunflower meal were mixed into the water until thoroughly wetted. A solubilization agent, in the form of 5½ lbs. of sodium hydroxide dissolved in 20 lbs. of water, was added to the slurry and mixing continued for approximately 10 minutes. Then 90 lbs. of tallow at 45 degrees C. was added and mixed for another 5 minutes. The mixture was pumped to a 200 gallon stainless steel vertical holding tank fitted with a cone bottom having an outlet of about 2" in diameter. From the holding tank the mixture was pumped to a stone mill (Model 830 obtained from Moorehouse Industries, Fullerton, Calif.) with the mill gap set at 0.008". The resulting emulsion was discharged into a mixer and, when about half of the above emulsion had been discharged into the mixture, 20 lbs. of 75% phosphoric acid was added with the mixer, with stirring. Stirring continued until a firm gel was formed. The gel was then transferred to an agricultural dryer (Heil Model S75-22B) which operated at an outlet temperature of between 180 and 190 degrees F. The product was dried until its moisture content was approximately 10% to 14%. A small amount (approximately 2.5 lbs.) of an absorbent in the form of calcium silicate (Microcell E sold by Johns Manville) was added to the final product to improve the flow characteristics.

The product obtained from the dryer was a dark brown odorless powder. Particle size varied from very fine to aggregate particles about ¼" in diameter. The resulting product was easy to handle and could be placed in paper sacks without apparent migration or leaching out of the lipid materials. The product contained approximately 35% by weight lipids and was suitable for mixing with common types of feed mixes.

EXAMPLE 15

A feed supplement prepared according to the procedures outlined in Example 14 was tested for its effect on the fat content in cows' milk. Three feed mixes were prepared for use in the test, the first mix being the baseline mix containing none of the feed supplement of the present invention. The other two test mixes contained 10% and 20% by weight, respectively, of a feed supplement prepared according to the procedures of Example 1. Table 1 indicates the makeup of each of the three mixes.

TABLE 1

| Baseline Mix | Test Mix #1-10% | Test Mix #2-20% |
|---|---|---|
| Barley-16 lbs. | Barley-12 lbs. | Barley-8 lbs. |
| Alfalfa hay-24 lbs. | Alfalfa hay-24 lbs. | Alfalfa hay-24 lbs. |
| | Feed Supplement-4 lbs. | Feed Supplement-8 lbs. |

Each of the three mixes was fed to the same cow under substantially the same conditions. The cow was fed each of the mixes separately for a period of 6 days each. Each day the total milk output of the cow was measured and the milk analyzed for fat content. The results of this procedure are tabulated in Table 2.

TABLE 2

| Feed | Daily Avg. Total Lbs. Milk | Daily Avg. Total Lbs. Fat |
|---|---|---|
| Baseline | 51.2 | 1.74 |
| Test Mix #1 | 49.5 | 2.02 |
| Test Mix #2 | 50.3 | 2.14 |

As is shown by Table 2, the output of milk by the cow was only slightly affected by the addition of feed supplements while the fat content produced increased remarkably. For instance, when Mix #1 containing 10% of the feed supplement of the subject invention was fed to the cow, the fat content of the milk increased by 20% over the fat content found in milk produced while the cow ws on the baseline feed. Mixture #2, containing 20% feed supplement, resulted in a 23% increase of fat content in the milk.

EXAMPLE 16

The procedures of Example 15 were followed with the exception that feed supplement content was raised to 30% by weight. Table 3 shows the content of the test mix and baseline feeds and Table 4 shows the results obtained:

TABLE 3

| Baseline Mix | Test Mix #3-30% |
|---|---|
| Barley-24 lbs. | Barley-12 lbs. |
| Alfalfa hay-24 lbs. | Alfalfa hay-24 lbs. |
| | Feed Supplement-12 lbs. |

TABLE 4

| Feed | Daily Avg. Total Lbs. Milk | Daily Avg. Total Lbs. Fat |
|---|---|---|
| Baseline | 48.7 | 1.640 |
| Test Mix #3 | 47.1 | 2.078 |

As can be seen from Table 4, the use of Test Mix #3 which contained 30% by weight feed supplement resulted in a surprising increase of approximately 26% in the fat content of the milk produced.

EXAMPLE 17

Soft offals (sheep and cattle guts) containing approximately 50% fat D.M.B. were passed through a Fryma plate mill with 8 mm holes. The resultant product was a thick homogenate. This was added to a Leyland mixer and 1% of sodium hydroxide (in water) stirred in for 5 minutes. This resulted in gel formation. Hydrochloric acid was then added (33% commercial solution) to lower the pH to 3.5. The gel stood overnight to synerese and was dried the following morning through a ring dryer. An analysis of the dried product gave the following results:

| Dry Matter | 93.8% |
|---|---|
| Fat (DMB) | 42.3% |
| *pH | 4.6% |

FEEDING TRIAL

The following cross-over procedure was adopted and fed to a lactating dairy cow.
Period I—7 days feeding @ 10 lbs. barley/head/day.
Period II—10 days feeding @ 7 lbs. barley and 3 lbs. product/head/day.
Period III—10 days feeding @ 10 lbs. barley/head/day.

Palatability problems were encountered and overcome by use of liquid molasses. Note, however, that the product was 30% of concentrate feed compared with 10%–15% in a commercial situation.

Daily milk yields and milk components were recorded. For analysis purposes the data from the last 7 days in each control period and the last 5 days in the treatment period were used.

RESULTS

These are shown for milk and fat in the attached Table.

| RESULTS | | | |
|---|---|---|---|
| | (lb) Milk Yield | % Fat | Fat Yield |
| Control Period I | 34.0 | 3.52 | 1.24 |
| Control Period III | 37.0 | 3.35 | 1.24 |
| Control Average | 35.5 | 3.43 | 1.24 |
| Treatment Period II | 42.1 | 3.23 | 1.35 |
| Treatment Gain | +6.6 | −.20 | +.11 |
| % Increase | +18% | −6% | +9% |

While this invention has been described in relation to its preferred embodiments, it is to be understood that various modifications thereof will now be apparent to one skilled in the art upon reading the specification, and it is intended to cover such modifications as fall within the scope of the appended claims.

What is claimed is:

1. A process for producing nutrient compositions containing microencapsulated lipids in proteinaceous matter consisting of:
    (a) contacting particulate protein and water and adjusting the pH thereof to a pH value between about 9 and about 13 by the addition of a protein solubilization agent thereto and admixing the resulting mixture to solubilize said protein in said water;
    (b) admixing a lipid material with the solubilized protein so as to form an emulsion wherein said lipid is in the form of globules of sizes in the range of from about 0.5 to about 50 microns; and
    (c) contacting the emulsion with an effective amount of pH adjusting agent to lower the pH of the emulsion to at least its isoelectric point, thereby aggregating the protein and microencapsulating the lipid to thereby form said nutrient composition.

2. The process of claim 1 wherein the particulate protein is solubilized by contacting it with a solubilization agent selected from the group consisting of the nontoxic alkali and alkaline earth metal hydroxides.

3. The process of claim 2 wherein the solubilization agent is sodium hydroxide.

4. The process of claim 2 wherein the solubilization agent is in aqueous solution when contacted with the particulate proteinaceous matter.

5. The process of claim 1 wherein the lipid material is heated to its melting point prior to admixing with the solubilized protein.

6. The process of claim 1 wherein the wherein said admixing of said lipid material with said solubilized protein creates frictional heat which is sufficient to raise the temperature of the lipid material above its melting point.

7. The process of claim 1 wherein the solubilized proteinaceous matter is heated to a temperature above the melting point of the lipid material prior to admixing with the lipid.

8. The process of claim 1 wherein the emulsion contains from about 5 to about 40% by weight protein, from about 50 to about 70% by weight water, and from about 6 to about 25% by weight lipid.

9. The process of claim 1 wherein the pH adjusting agent is selected from the group consisting of phosphoric acid, hydrochloric acid, lactic acid, acetic acid, sulfuric acid, and salts of polyvalent metals.

10. The process of claim 1 wherein the size of the particulate proteinaceous matter is not greater than about 1/8".

11. The process of claim 1 wherein the particulate proteinaceous matter is selected from the group consisting of animal bone, animal tissue, fish bone, fish tissue, poultry bone, poultry tissue, vegetable protein, milk whey, and collagen.

12. The process of claim 1 wherein the lipid material is selected from the group consisting of animal fat, poultry fat, fish oil, polyunsaturated vegetable oil, and dairy products.

13. A method of providing dietary lipid and proteinaceous material to ruminant animals such that when consumed by said ruminant said lipid bypasses the rumen and is assimilated in the abomasum and lower gut comprising: feeding said ruminant animals a nutrient composition produced by the process of claim 1.

14. The process of claim 1 wherein the pH of the pH adjusted emulsion at its isoelectric point ranges from about 3.0 to about 8.5.

15. The process of claim 1 wherein the proteinaceous matter is meat and the pH of the emulsion is lowered to its isoelectric point.

16. The process of claim 1 wherein the admixing step is performed at a temperature from about 40 to about 60 degrees C.

17. The product produced according to the process of claim 1.

18. The process of claim 1 wherein the lipid globules range in size from about 0.5 microns to about 10 microns.

19. The process of claim 1 including the additional step of grinding proteinaceous matter into particulate form prior to solubilizing.

20. The product of claim 17 incorporated into meat products suitable for human consumption.

21. The product of claim 20 wherein the meat products suitable for human consumption are selected from the group consisting of meat patties, sausage, and bologna.

22. A process for producing nutrient compositions containing microencapsulated lipids in proteinaceous matter consisting of:
   (a) grinding the proteinaceous matter to particulate form;
   (b) simultaneously with the grinding step of (a), contacting said protein with water and adjusting the pH value between about 9 and about 13 with a protein solubiliization agent and admixing the resultng mixture to solubilize said protein in said water;
   (c) admixing a lipid material with the solubilized proteinaceous matter so as to form an emulsion wherein said lipids are in the form of globules of a size in the range of from about 0.5 to about 50 microns; and
   (d) contacting the emulsion with an effective amount of a pH adjusting agent to lower the pH of the emulsion to at least its isoelectric point, thereby aggregating the protein and microencapsulating the lipid to thereby form said nutrient composition.

23. The process of claim 22 wherein said pH of the particulate proteinaceous matter and water is adjusted by contacting it with a solubilization agent selected from the group consisting of the nontoxic alkali and alkaline earth metal hydroxides.

24. The process of claim 23 wherein the solubilization agent is sodium hydroxide.

25. The process of claim 23 wherein the solubilization agent is in aqueous solution when added to the particulate proteinaceous matter.

26. The process of claim 22 wherein the lipid material is heated to its melting point prior to admixing with the solubilized proteinaceous material.

27. The process of claim 22 wherein said admixing of said lipid material and said solubilized protein creates frictional heat which is sufficient to raise the temperature of the lipid material above its melting point.

28. The process of claim 22 wherein the solubilized proteinaceous matter is heated to a temperature above the melting point of the lipid material prior to admixing with the lipid.

29. The process of claim 22 wherein the emulsion contains from about 5 to about 40% by weight protein, from about 50 to about 70% by weight water, and from about 6 to about 25% by weight lipid.

30. The process of claim 22 wherein the pH adjusting agent is selected from the group consisting of phosphoric acid, hydrochloric acid, lactic acid, acetic acid, sulfuric acid, and salts of polyvalent metals.

31. The process of claim 22 wherein the size of the particulate proteinaceous matter is not greater than about ⅛".

32. The process of claim 22 wherein the particulate proteinaceous matter is selected from the group consisting of animal bone, animal tissue, fish bone, fish tissue, poultry bone, poultry tissue, vegetable protein, milk whey, and collagen.

33. The process of claim 22 wherein the lipid material is selected from the group consisting of animal fat, poultry fat, fish oil, polyunsaturated vegetable oil, and dairy products.

34. The process of claim 22 wherein the pH of the pH adjusted emulsion at its isoelectric point ranges from about 3.0 to about 8.5.

35. The process of claim 22 wherein the proteinaceous matter is meat and the pH of the emulsion is lowered to its isoelectric point.

36. The process of claim 22 wherein the admixing step is performed at a temperature of from about 40 to about 60 degrees C.

37. The product produced according to the process of claim 22.

38. The process of claim 22 wherein the lipid globules range in size from about 0.5 microns to about 10 microns.

39. The product of claim 37 incorporated into meat products suitable for human consumption.

40. The product of claim 39 wherein the meat products suitable for human consumption are selected from the group consisting of meat patties, sausage, and bologna.

41. A process for producing processed meat products containing microencapsulated lipids in proteinaceous matter comprising:
   (a) grinding a mixture of proteinaceous matter, lipid, and water which has at least 5 weight percent protein based upon said lipid said mixture comprising meat;
   (b) adding an effective amount of a solubilization agent to said mixture to result in a pH thereof between about 9 and about 13 to thereby solubilize said proteinaceous matter in said water;
   (c) agitating the mixture of solubilized proteinaceous matter and lipids for an effective period of time to form an emulsion wherein said lipid is in globule form having sizes in the range of from about 0.5 to about 50 microns; and
   (d) contacting the emulsion with an effective amount of a pH adjusting agent to lower the pH of the emulsion to at least the isoelectric point of said proteinaceous matter, thereby aggregating said proteinaceous matter and microencapsulating said lipid to thereby form said processed meat product.

42. The process of claim 41 wherein the particulate proteinaceous matter is solubilized by contacting it with a solubilization agent selected from the group consisting of the nontoxic alkali and alkaline earth metal hydroxides.

43. The process of claim 42 wherein the solubilization agent is sodium hydroxide.

44. The process of claim 41 wherein the solubilization agent is in aqueous solution when added to the proteinaceous matter.

45. The process of claim 41 wherein the mixture of proteinaceous matter and lipid is heated to a temperature above the melting point of the lipid material.

46. The process of claim 41 wherein the pH adjusting agent is selected from the group consisting of phosphoric acid, hydrochloric acid, lactic acid, acetic acid, sulfuric acid, and salts of polyvalent metals.

47. The process of claim 41 wherein the lipid globules range in size from about 0.5 to about 10 microns.

48. The process of claim 41 wherein the size of the particulate proteinaceous matter is not greater than about ⅛".

49. The process of claim 41 wherein the particulate proteinaceous matter is selected from the group consisting of animal bone, animal tissue, fish bone, fish tissue, poultry bone, poultry tissue, vegetable protein, milk whey, and collagen.

50. The process of claim 41 wherein the lipid material is selected from the group consisting of animal fat, poultry fat, fish oil, polyunsaturated vegetable oil, and dairy products.

51. The process of claim 41 wherein the pH of the pH adjusted emulsion at its isoelectric point ranges from about 3.0 to about 8.5.

52. The process of claim 41 wherein the proteinaceous matter is meat and the pH of the emulsion is lowered to a value in the range of from about 6.5 to about 8.5.

53. The product produced according to the process of claim 41.

54. The product of claim 41 incorporated into meat products suitable for human consumption.

55. The product of claim 41 wherein the meat products suitable for human consumption are selected from the group consisting of meat patties, sausage, and bologna.

56. A process for microencapsulating lipids selected from the groups comprising polyunsaturated vegetable oil and animal fats into textured vegetable protein for inclusion into meat products consisting of:
   (a) solubilizing said textured vegetable protein in water by adding an effective amount of a solubilization agent to effect a pH in the range of from about 9 to about 13 therein;
   (b) blending the resulting solubilized textured vegetable protein for an effective amount of time to produce a smooth texture;
   (c) admixing a lipid selected from the group comprising polyunsaturated vegetable oil and animal fat for an effective period of time to form an emulsion containing solubilized protein and fat in the form of discrete globules having a particle size in the range of from about 0.5 to about 50 microns; and
   (d) contacting the emulsion with an effective amount of pH adjusting agent to lower the pH of the emulsion to at least the isoelectric point of said textured protein, thereby aggregating the protein and microencapsulating the fat.

57. The product formed according to the process of claim 56.

58. The product of claim 57 further mixed with ground lean meat.

59. The process of claim 56 wherein the solubilization agent is selected from the group consisting of alkali and alkaline earth metal hydroxides.

60. The process of claim 56 wherein the polyunsaturated vegetable oil is safflower oil.

61. The process of claim 56 wherein the pH adjusting agent is phosphoric acid.

62. The method of claim 56 wherein the pH of the solubilized mixture is about 11.7.

63. The process of claim 56 wherein the pH of the pH adjusted emulsion at its isoelectric point is about 7.5.

64. The process of claim 56 wherein animal fat is heated to a temperature above its melting point prior to admixing with the solubilized textured vegetable protein.

65. A process for microencapsulating the fat contained in cheese comprising:
   (a) contacting ground cheese with an effective amount of a solubilization agent to effect a pH in the range of from about 9 to about 13 therein and to solubilize the protein contained in the cheese;
   (b) agitating the solubilized mixture to form an emulsion containing the solubilized protein and fat in the form of discrete globules having sizes in the range of from about 0.5 to about 50 microns;
   (c) contacting the emulsion with an effective amount of a pH adjusting agent to lower the pH of the emulsion to the isoelectric point of said protein, thereby aggregating the protein and microencapsulating the fat; and
   (d) drying the resulting gel to form a granular to powder particulate having no signs of free fat.

66. The powdered cheese product prepared according to the process of claim 65.

67. The process of claim 65 wherein the solubilization agent is an aqueous solution of sodium hydroxide.

68. The process of claim 65 wherein the pH adjusting agent is phosphoric acid.

69. The process of claim 65 wherein the pH of the solubilized mixture is about 9.3.

70. The process of claim 65 wherein the pH of the pH adjusted emulsion at its isoelectric point is about 4.7.

71. A process for producing animal meal from animal processing wastes comprising:
   (a) grinding the animal wastes to form a slurry, said animal wastes containing fat and at least 5 weight percent protein;
   (b) simultaneously with the grinding step of (a), solubilizing the protein contained within the slurry with an effective amount of a solubilization agent to impart a pH thereto in the range of from about 9.5 to about 13;
   (c) agitating the slurry for an effective period of time to form an emulsion containing solubilized protein and fat in the form of discrete globules having particle sizes in the range of from about 0.5 to about 50 microns; and
   (d) contacting the emulsion with an effective amount of a pH adjusting agent to lower the pH of the emulsion to the isoelectric point of said protein, thereby aggregating the protein and microencapsulating the fat.

72. The animal meal produced by the process of claim 71.

73. The process of claim 71 wherein the solubilization agent is selected from the group consisting of sodium hydroxide, calcium hydroxide, and potassium hydroxide.

74. The process of claim 71 wherein the slurry is sufficiently agitated to form an emulsion containing fat in the form of discrete globules having a particle dimension ranging from about 0.5 to about 10 microns.

75. The process of claim 71 wherein the pH of the pH adjusted emulsion at its isoelectric point ranges from about 3.0 to about 8.5.

76. The process of claim 71 wherein the pH adjusting agent is selected from the group consisting of phosphoric acid, hydrochloric acid, sulfuric acid, acetic acid, and salts of polyvalent metals.

77. The process of claim 71 including the additional steps of:
   contacting the resulting fat encapsulated animal meal with an effective amount of a pH adjusting agent to lower the pH level of the animal meal to less than about 6.5; and maintaining the animal meal for an effective period of time to effect syneresis of the animal meal.

78. The process of claim 77 wherein the water exuded during syneresis is separated from the animal meal.

79. The process of claim 71 wherein the resulting fat encapsulated animal meal is dried to form a particulate powder.

80. The process of claim 71 wherein the animal waste is heated to a temperature above the melting point of the fat contained therein during the step of grinding the animal wastes to a slurry.

81. The process of claim 71 wherein agitation of the slurry to form the emulsion is carried out at a temperature sufficient to melt the fat contained within the slurry.

82. The process of claim 71 wherein the agitation step is carried out at the temperature of from about 40 to about 60 degrees C.

83. The process of claim 79 wherein water is admixed with the powdered animal meal formed thereby, and the individual particles of meal absorb up to about 80 weight percent water.

84. The process of claim 80 wherein the protein containing slurry is solubilized after said grinding.

85. A process for producing a lipid containing feed supplement containing from about 5 to about 40 weight percent proteinaceous material, from about 50 to about 70 percent by weight water, and from about 6 to about 25 weight percent liquid consisting of:
 (a) solubilizing said proteinaceous material in said water to form a proteinaceous water mixture by contacting said proteinaceous material in water with an effective amount of a solubilization agent to yield a pH in the range of from about 9 to about 13;
 (b) admixing said lipid material with the proteinaceous solution to form an emulsion wherein said lipid material is in globule form having particle sizes in the range of from about 0.5 to about 50 microns;
 (c) contacting the emulsion with an effective amount of a pH adjusting agent sufficient to lower the pH of the emulsion to not greater than about 6 and to cause gelatinization of the emulsion; and
 (d) drying the resulting gel to form a particulate feed supplement.

86. The process of claim 85 wherein prior to the step of drying the resulting gel, free water is separated therefrom.

87. The process of claim 85 wherein the proteinaceous material is solubilized by a solubilization agent selected from the group consisting of the alkali and alkaline earth metal hydroxides.

88. The process of claim 87 wherein the solubilization agent is sodium hydroxide.

89. The process of claim 85 wherein the solubilization agent is in aqueous solution when contacted with the proteinaceous material.

90. The process of claim 85 wherein the emulsion is prepared by admixing an aqueous solution containing from about 5 to about 40 weight percent protein as the continuous phase and from about 6 to about 25 weight percent liquid lipid material as the disperse phase.

91. The process of claim 85 wherein the lipid material is in liquid form during admixture with the proteinaceous material to form the emulsion.

92. The process of claim 85 wherein the preferred pH adjusting agent is an acid selected from the group consisting of phosphoric acid, lactic acid, acetic acid, and sulfuric acid.

93. The process of claim 85 wherein the pH of the pH adjusted emulsion at its isoelectric point ranges from about 3.0 to about 5.0.

94. The process of claim 85 wherein the preferred moisture content of the particulate feed supplement is not more than about 14 weight percent of the total particulate feed supplement.

95. The feed supplement produced by the process of claim 85.

96. A method of providing dietary lipid and proteinaceous material to ruminant animals such that when consumed by said ruminant said lipid bypasses the rumen and is assimilated in the abomasum and lower gut comprising: feeding said ruminant aninals animal meal produced by the process of claim 71.

97. A method of providing dietary lipid and proteinaceous material to ruminant animals such that when consumed by said ruminant said lipid bypasses the rumen and is assimilated in the abomasum and lower gut comprising: feeding said ruminant animals the feed supplement produced by the process of claim 85.

* * * * *

UNITED STATES PATENT AND TRADEMARK OFFICE
CERTIFICATE OF CORRECTION

PATENT NO. : 4,217,370

DATED : August 12, 1980

INVENTOR(S) : Robert M. Rawlings, et al.

It is certified that error appears in the above-identified patent and that said Letters Patent are hereby corrected as shown below:

Col. 1, line 39 change "meat" to --meats--;
      line 42, change "problems" to --problem--.

Col. 2, line 29, change "diegestion" to --digestion--.

Col. 8, line 35, change "ruminants" to --ruminant's--;
      line 48, change "has" to --had--.

Col. 10, line 5, change "simsultaneously" to --simultaneously--.

Col. 11, line 19, change "microencapsulated to --microencapsulation--.

Col. 14, line 30, change "ws" to --was--.

Col. 15, line 8, after the table insert --*reconstituted 1:4 w/v with distilled water.--;
      line 31, change "RESULTS" to --EXAMPLE 17 RESULTS--

Col. 22, line 34, change "aninals" to --animals--.

Signed and Sealed this

Sixteenth Day of December 1980

[SEAL]

Attest:

SIDNEY A. DIAMOND

Attesting Officer

Commissioner of Patents and Trademarks